United States Patent [19]

Neukam et al.

[11] 4,052,355

[45] Oct. 4, 1977

[54] ACRYLONITRILE POLYMER SOLUTIONS

[75] Inventors: Theo Neukam, Dormagen; Francis Bentz, Cologne; Günther Nischk, Dormagen, all of Germany

[73] Assignee: Bayer Aktiengesellschaft, Leverkusen, Germany

[21] Appl. No.: 658,904

[22] Filed: Feb. 18, 1976

[30] Foreign Application Priority Data

Feb. 22, 1975 Germany ............................ 2507777

[51] Int. Cl.$^2$ .......................... C08F 4/34; C08F 20/44; C08K 5/34
[52] U.S. Cl. ............................ 260/30.2; 260/30.8 DS; 260/32.6 N; 260/79.3 M; 526/208; 526/328; 526/341; 526/342
[58] Field of Search ................... 260/85.5 R, 85.5 F, 260/85.5 N, 88.7 R, 88.7 D, 88.7 F, 79.3 M, 30.2, 30.8 DS, 32.6 N; 526/208, 341, 342

[56] References Cited

U.S. PATENT DOCUMENTS

| 3,025,278 | 3/1962 | Pitts | 260/85.5 R |
|---|---|---|---|
| 3,463,616 | 8/1969 | Corradi et al. | 260/85.5 N |
| 3,634,370 | 1/1972 | D'Alelio | 260/85.5 R |

OTHER PUBLICATIONS

Dagon et al., *Chem. Abs.* 72 (1970), p. 13108c.

*Primary Examiner*—Harry Wong, Jr.
*Attorney, Agent, or Firm*—Plumley and Tyner

[57] ABSTRACT

This invention relates to the production of spinnable solutions of acrylonitrile homopolymers or acrylonitrile copolymers in which the polymerization is conducted in an organic solvent containing a catalyst system comprising an acid, e.g., sulfuric acid, a peroxodisulfate, e.g., ammonium peroxodisulfate, and a 1,3-diketone, e.g., acetyl acetone. Polymers having a good natural color and high K-values are obtained in good yields.

17 Claims, No Drawings

ACRYLONITRILE POLYMER SOLUTIONS

This invention relates to a process for the production of spinnable solutions of acrylonitrile polymers and copolymers by polymerisation carried out in organic solvents in the presence of a catalyst system.

The advantages which the solution polymerisation of acrylonitrile has over conventional industrial processes where polymerisation is carried out in aqueous medium, are known: there is no need for the polymers to be isolated, dried, size-reduced and re-dissolved, so that a spinnable solution is directly obtained in a simple manner from a solution of monomers.

Boron trifluoride, azo compounds, inorganic and organic peroxides and the sodium salt of toluene sulphinic acid, have been used as catalysts for the solution polymerisation of acrylonitrile in organic solvents. In cases where boron trifluoride is used, however, the yields of polymer and the molecular weights obtained are not high enough. In cases where azo compounds and peroxides alone are used, high reaction temperatures or long reaction times are required to obtain commercially useful products. In the case of peroxides, however, the high reaction temperatures result in discoloration of the solution, especially where dimethyl formamide is used as a solvent. In cases where azo catalysts are used, the solution polymerisation process has to be carried out in the strict absence of air on account of its inhibiting effect. Peroxides with formamidine sulphinic acid have been used as redox catalyst for solution polymerisation in dimethyl sulphoxide. Unfortunately, the polymerisation velocities obtained were not high enough.

Accordingly, there is still a need for a solution polymerisation process for acrylonitrile and, optionally, comonomers, in which molecular weights suitable for the production of filaments and fibers can be obtained in reasonable reaction times at the usual polymerisation temperatures.

The object of the present invention is to provide such a polymerisation process.

It has now been found that acrylonitrile homopolymers and copolymers with a very good natural colour and favourable K-values can be obtained by carrying out the polymerisation reaction in organic solvents and in the presence of a catalyst system consisting of a peroxodisulphate, a 1,3-diketone and an acid.

Accordingly, the present invention relates to a process for the production of a spinnable solution of an acrylonitrile polymer or copolymer which comprises polymerising acrylonitrile on its own or together with at least one other monomer in an organic solvent and in the presence of an acid, a peroxodisulphate and a 1,3-diketone.

The polymer obtained by the process according to the invention preferably has an acrylonitrile content of at least 90% by weight.

The other comonomers which may be used in the process according to the invention are preferably unsaturated polymerisable carboxylic acid esters, of which acrylic acid esters are particularly preferred. Among the acrylic acid esters which may be used, methyl acrylate is particularly preferred. These additional comonomers are preferably used in a quantity of from 5 to 8% by weight, based on the monomers.

In order to improve the dyeability of the polymers, monomers which improve the affinity of the polymer for dyes are copolymerised. As known from the prior art, monomers with this property are in particular monomers containing acid groups. Among these monomers, monomers containing sulphonic acid groups such as, for example, styrene sulphonic acid, allyl sulphonic acid, methallyl sulphonic acid and their salts, are particularly preferred.

Preferred polymerisation solvents are strongly polar organic solvents, of which dimethyl formamide, dimethyl acetamide, dimethyl sulphoxide and N-methyl pyrrolidone are particularly suitable.

The reaction is preferably carried out with a monomer concentration in the solvent at the beginning of the reaction of from 30 to 40% by weight.

Alkali and alkaline earth metal peroxodisulphates may be used as the peroxidisulphates, although it is preferred to use ammonium peroxodisulphate.

Among the 1,3-diketones which may be used in accordance with the invention, dibenzoyl methane, benzoyl actetone and acetyl propionyl methane are mentioned by way of example. Acetyl acetone is preferably used as the 1,3-diketone.

In cases where polymerisation is carried out in the sole presence of a peroxo disulphate and a 1,3-diketone, i.e. in the absence of an acid, acrylonitrile homopolymers and copolymers with an extremely unfavourable natural colour and a low K-value are obtained.

It is surprising that the addition of only a very small quantity of acid is sufficient to give colourless polymers with extremely favourable K-value. An addition of only 0.13% by weight, based on the total quantity (monomers + solvent) is sufficient to obtain effects of this kind.

Accordingly, an acid is required as an additional component in the reaction system in order to obtain colourless polymers with favourable K-values. Suitable acids include both inorganic and organic acids, although it is also possible to use a mixture of inorganic and organic acids. Suitable inorganic acids are, in particular, nitric acid, phosphoric acid and hydrochloric acid, but preferably sulphuric acid. Suitable organic acids are, for example, benzene sulphonic acid, $\alpha$- and $\beta$- naphthalene sulphonic acid, 3-chlorobenzene sulphonic acid, 1,3-benzene disulphonic acid and oxalic acid, but preferably p-toluene sulphonic acid.

As is the case with conventional catalyst-activator systems, the molar ratio of the peroxodisulphate to the 1,3-diketone may be varied within wide limits. A ratio of from 1 : 1.1 to 1 : 3 has proved to be particularly advantageous. As already mentioned, the quantity of acid added may be very small. It is particularly advantageous to use the acid in quantities with a molar ratio of 1:1.2 to 1:3.2 to the molar quantity of 1,3-diketone.

It is particularly advantageous to add the peroxodusulphate/1,3-diketone system to the reaction mixture in portions. The reaction time generally amounts to between 8 and 24 hours, the reaction best being carried out under an inert gas, preferably nitrogen. The reaction is advantageously carried out at an elevated temperature. Temperatures in the range of from 35° to 55° C have proved to be particularly advantageous. The polymerisation reaction is exothermic, so that the reaction takes place for several hours at the required temperature without any need for additional heat to be applied. It is known that unreacted acrylonitrile in the solution acts as a precipitant. Although clouding occurs during the polymerisation reaction, it disappears after distilling off the unreacted monomers on completion of polymerisation. The solution is concentrated either by a standard distillation technique or, preferably, by means of a thin-layer evaporator at low temperatures. It was surprising that, in cases where the above-mentioned catalysts are used, no clouding occurs during polymerisation providing the reaction is carried out in the presence of an unsaturated carboxylic acid ester, preferably methyl acrylate, in a quantity of from 5 to 8% and preferably in a quantity of from 6 to 7%, based on the monomers used.

The yields generally amount to between 55 and 60% whilst the K-values are on average between 82 and 84. After the unreacted fractions have been distilled off, polymer solutions with a viscosity of from 1300 to 1700 poises (20° C) are obtained and may be stored for prolonged periods without any significant change in their viscosity. In this form the solutions may be dry-spun. In order to obtain a solution suitable for wet spinning, the polymer solutions obtained are diluted with the particular solvent used to such an extent that a viscosity of from 360 to 550 poises (20° C) is obtained.

The spun filaments are distinguished by an extremely good natural colour and very favourable textile properties. The strength of the filaments obtained amounts to between about 2 and 2.5 p/dtex.

In the following Examples, the parts by volume quoted are to the parts by weight quoted as cc to grams, unless otherwise indicated. These Examples are to further illustrate the invention without limiting it.

EXAMPLE 1

1180 parts by volume of acrylonitrile, 52 parts by volume of methyl acrylate and 2 parts by volume of concentrated sulphuric acid are introduced under nitrogen at a temperature of 40° C into 1800 parts by weight of dimethyl formamide. Polymerisation is initiated by the addition of 2.7 parts by volume of acetyl acetone and 3.6 parts by weight of ammonium peroxodisulphate. 2 hours later 1.8 parts by volume of acetyl acetone and 2.7 parts by weight of ammonium peroxodisulphate are added to the solution. After another 1.5 hours, the polymerisation reaction is re-initiated by the addition of 1.35 parts by volume of acetyl acetone and 2.25 parts by weight of ammonium peroxodisulphate. Finally, 0.9 part by volume of acetyl acetone and 1.8 parts by weight of ammonium peroxodisulphate are added after another hour. The polymerisation time is 20 hours, and the viscosity of the solution amounts to 2090 poises (20° C). After the monomers have been distilled off, the solution is diluted with dimethyl formamide to form a 32.6% solution. The spinning solution obtained has a viscosity of 755 poises. Yield: 65%, K-value: 84.

EXAMPLE 2

2360 parts by volume of acrylonitrile, 104 parts by volume of methyl acrylate and 4 parts by volume of concentrated sulphuric acid are taken up in 3800 parts by weight of dimethyl formamide. Using an initiator system consisting of acetyl acetone and ammonium peroxodisulphate, polymerisation is catalysed in accordance with the following scheme (under nitrogen at a temperature of 40° C):

| Time (hours) | Acetyl acetone (parts by volume) | $(NH_4)_2S_2O_8$ (parts by weight) |
|---|---|---|
| 0 | 5.4 | 7.2 |
| 2 | 4 | 5.5 |
| 3.5 | 2.7 | 4.5 |

-continued

| Time (hours) | Acetyl acetone (parts by volume) | $(NH_4)_2S_2O_8$ (parts by weight) |
|---|---|---|
| 4.5 | 1.8 | 3 |

The polymerisation time is 18 hours, and the viscosity of the solution is 1800 poises (20° C). After the monomers have been distilled off, the solution is diluted with dimethyl formamide. The spinning solution obtained has a viscosity of 450 poises (20° C). Yield: 73%, K-value: 80.

EXAMPLE 3

1180 parts by volume of acrylonitrile, 52 parts by volume of methyl acrylate and 2 parts by volume of concentrated sulphuric acid are dissolved in 1900 parts by weight of dimethyl formamide. Polymerisation is initiated under nitrogen at a temperature of 40° C in accordance with the following scheme:

| Time (hours) | Acetyl acetone (parts by volume) | $(NH_4)_2S_2O_8$ (parts by weight) |
|---|---|---|
| 0 | 2.7 | 3.6 |
| 2 | 1.8 | 2.7 |
| 3¼ | 1.35 | 2.25 |
| 4¼ | 0.9 | 1.8 |

The polymerisation time is 20 hours. The solution has a viscosity of 1225 poises (20° C). After the monomers have been distilled off, the solution is diluted with dimethyl formamide, the resulting spinning solution having a viscosity of 595 poises (20° C). Yield: 57%, K-value: 83.

EXAMPLE 4 (Comparison)

1180 parts by volume of acrylonitrile and 52 parts by volume of methyl acrylate are taken up in 1800 parts by weight of dimethyl formamide. The quantity of catalyst used is the same as in Example 3. In contrast to the preceding Example, however, no acid is added. In other respects, the reaction conditions correspond to those of Example 3. The spinning solution obtained in this test is yellow in colour, indicating heavy discoloration. It has a K-value of 68. Yield: 95%.

EXAMPLE 5

2360 parts by volume of acrylonitrile, 104 parts by volume of methyl acrylate and 4 parts by volume of concentrated sulphuric acid are introduced into 4000 parts by weight of dimethyl formamide. The catalyst system is added under nitrogen at a temperature of 40° C in accordance with the following scheme:

| Time (hours) | Acetyl acetone (parts by volume) | $(NH_4)_2S_2O_8$ (parts by weight) |
|---|---|---|
| 0 | 5.4 | 7.2 |
| 2 | 4 | 5.5 |
| 3½ | 2.7 | 4.5 |
| 4½ | 1.8 | 3.6 |

The polymerisation time is 19 hours and the viscosity of the solution is 1145 poises (20° C). The monomers still present are removed by means of a thin-layer evaporator, and the residual solution is diluted with dimethyl formamide to such and extent that it has a viscosity of 675 poises (20° C). Yield: 65%, K-value: 85.

EXAMPLE 6

2310 parts by volume of acrylonitrile, 113 parts by volume of methyl acrylate and 20 parts by weight of the sodium salt of methallyl sulphonic acid are introduced under introgen into 3400 parts by weight of dimethyl formamide containing 2 parts by volume of concentrated sulphuric acid. Polymerisation is initited at a temperature of 40° C in accordance with the following reaction scheme:

| Time (hours) | Acetyl acetone (parts by volume) | $(NH_4)_2S_2O_8$ (parts by weight) |
|---|---|---|
| 0 | 5.4 | 7.2 |
| 2 | 4 | 5.5 |
| 5 | 1.8 | 3.6 |

The polymerisation time is 19.5 hours and the viscosity of the solution is 2520 poises (20° C). After the residual monomers have been removed in a thin-layer evaporator and the residual solution diluted with dimethyl formamide, a final viscosity of 590 poises (20° C) is obtained. Yield: 61%, K-value: 79.

EXAMPLE 7

118 parts by volume of acrylonitrile and 5.2 parts by volume of methyl acrylate are polymerised under nitrogen at a temperature of 40° C in 180 parts by weight of dimethyl formamide together with 0.1 part by volume of 95% nitric acid in accordance with the following reaction scheme:

| Time (hours) | Acetyl acetone (parts by volume) | $(NH_4)_2S_2O_8$ (parts by weight) |
|---|---|---|
| 0 | 0.3 | 0.4 |
| 2 | 0.2 | 0.3 |
| 3½ | 0.15 | 0.25 |
| 4½ | 0.1 | 0.2 |

The polymerisation time is 21 hours. Dilution with 85 parts by weight of dimethyl formamide gives a pale yellow solution with a viscosity of 700 poises (20° C). Yield: 60%, K-value: 77.5.

EXAMPLE 8

118 parts by volume of acrylonitrile and 5.2 parts by volume of methyl acrylate are taken up in 179 parts by weight of dimethyl formamide. Polymerisation is initiated under nitrogen at a temperature of 40° C. with hydrogen chloride gas in accordance with the following scheme:

| Time (hours) | Acetyl acetone (parts by volume) | $(NH_4)_2S_2O_8$ (parts by weight) |
|---|---|---|
| 0 | 0.4 | 0.6 |
| 2 | 0.2 | 0.3 |
| 3½ | 0.15 | 0.25 |
| 4½ | 0.1 | 0.2 |

The polymerisation time is 19.5 hours. The funal viscosity amounts to 755 poises (20° C). Yield: 68%, K-value: 75.

EXAMPLE 9

118 parts by volume of acrylonitrile and 5.2 parts by volume of methyl acrylate are polymerised under nitrogen at a temperature of 40° C in 180 parts by weight of dimethyl formamide in the presence of 0.1 part by weight of anhydrous oxalic acid by adding the initiator in accordance with the following scheme:

| Time (hours) | Acetyl acetone (parts by volume) | $(NH_4)_2S_2O_8$ (parts by weight) |
|---|---|---|
| 0 | 0.4 | 0.6 |
| 2 | 0.2 | 0.3 |
| 3½ | 0.15 | 0.25 |
| 4½ | 0.1 | 0.2 |

The polymerisation time is 22 hours. After dilution with 80 parts by weight of dimethyl formamide, the solution has a final viscosity of 436 poises (20° C). Yield: 85%, K-value: 78.

EXAMPLE 10

118 parts by volume of acrylonitrile, 5.2 parts by volume of methyl acrylate and 0.15 parts by weight of o-phosphoric acid (85%) are dissolved in 1800 parts by weight of dimethyl formamide. Polymerisation is initiated under nitrogen at a temperature of 40° C in accordance with the following scheme:

| Time (hours) | Acetyl acetone (parts by volume) | $(NH_4)_2S_2O_8$ (parts by weight) |
|---|---|---|
| 0 | 0.3 | 0.4 |
| 2 | 0.2 | 0.3 |
| 3½ | 0.15 | 0.25 |
| 4½ | 0.1 | 0.2 |

The polymerisation time is 22 hours. After dilution with 90 parts by weight of dimethyl formamide, the solution has a final fiscosity of 400 poises (20° C). Yield: 92%, K-value: 74.

EXAMPLE 11

118 parts by volume of acrylonitrile and 5.2 parts by volume of methyl acrylate are added under nitrogen at a temperature of 40° C to 180 parts by weight of dimethyl formamide and 1.3 parts by weight of p-toluene sulphonic acid. The reaction is initiated in accordance with the following scheme:

| Time (hours) | Acetyl acetone (parts by volume) | $(NH_4)_2S_2O_8$ (parts by weight) |
|---|---|---|
| 0 | 0.3 | 0.4 |
| 2 | 0.2 | 0.3 |
| 3½ | 0.15 | 0.25 |
| 4½ | 0.1 | 0.2 |

After a polymerisation time of 20 hours, the polymer solution has a viscosity of 463 poises (20° C). Yield: 39%, K-value: 79.

EXAMPLE 12

2260 parts by volume of acrylonitrile, 164 parts by volume of methyl acrylate and 22 parts by weight of the sodium salt of methallyl sulphonic acid are taken up in 5400 g of dimethyl sulphoxide containing 2 parts by volume of concentrated sulfuric acid, and the polymerisation reaction is initiated under nitrogen at a temperature of 45° C by the addition of 8 parts by weight of ammonium peroxidisulphate and 5 parts by volume of acetyl acetone. After 3 hours, the reaction is stopped by the addition of 40 parts by weight of hydroquinone. The solution has a viscosity of 1014 poises (20° C). Yield: 69%, K-value: 82.

EXAMPLE 13

Filaments were spun by a conventional wet-spinning process from the polymer obtained in accordance with Example 5. The testile properties are shown below:

| | |
|---|---|
| Denier | 4.6 dtex |
| Strength | 2.4 p/dtex |
| Elongation | 8 % |
| Boiling-induced shrinkage | 15 % |
| Heat-induced shrinkage | 13 % |
| Relative loop tenacity | 77 % |
| Relative loop elongation | 6 % |

1. A process for the production of a spinnable solution of acrylonitrile homopolymer or a copolymer of at least 90% by weight of acrylonitrile and up to 10% by weight of an unsaturated copolymerizable monomer which comprises polymerizing acrylonitrile or a mixture of acrylonitrile and an unsaturated copolymerizable monomer in an organic solvent in the presence of a catalyst system comprising an acid, a peroxodisulphate and a 1,3-diketone in which said acid is nitric acid, phosphoric acid, hydrochloric acid, sulphuric acid, benzene sulphonic acid, α-naphthalene sulphonic acid, β-naphthalene sulphonic acid, 3-chlorobenzene sulphonic acid, 1,3-benzene disulphonic acid or oxalic acid; the molar ratio of peroxodisulphate to 1,3-diketone is 1.1.:1 to 1:3; to molar ratio of 1,3-diketone to acid is 1.2:1 to 3.2:1; and said acid and the amount thereof is such that the acrylonitrile polymer or copolymer produced is less colored and has a K-value higher than is obtained by the same process conducted without said acid.

2. The process of claim 1, wherein polymerisation is carried out at an elevated temperature.

3. The process of claim 2, wherein polymerisation is carried out at temperatures in the range of from 35° to 55° C.

4. The process of claim 1, wherein said peroxodisulphate is ammonium peroxodisulphate.

5. The process of claim 1, wherein said 1,3-diketone is acetyl acetone.

6. The process of claim 1, wherein said acid is an inorganic, an organic acid or a mixture thereof.

7. The process of claim 6, wherein said inorganic acid is sulphuric acid, nitric acid, phosphoric acid or hydrochloric acid.

8. The process of claim 6, wherein said organic acid is a member selected from the group consisting of p-toluene sulphonic acid, benzene sulphonic acid, α- or β-naphthalene sulphonic acid, 3-chlorobenzene sulphonic acid, 1,3-benzene disulphonic acid and oxalic acid.

9. The process of claim 1, wherein said unsaturated copolymerisable monomer is a carboxylic acid ester.

10. The process of claim 9, wherein said unsaturated copolymerisable carboxylic acid ester is an acrylic acid ester.

11. The process of claim 10, wherein said acrylic acid ester is methyl acrylate.

12. The process of claim 9, wherein said unsaturated copolymerisable carboxylic acid ester is copolymerized in a quantity of from 5 to 8 % by weight, based on the monomers.

13. The process of claim 1, wherein said unsaturated polymerizable monomer is a monomer which increases the affinity of the polymer for dyes.

14. The process of claim 13, wherein said dye-affinity increasing monomer is a monomer containing at least one acid group.

15. The process of claim 14, wherein said unsaturated polymerizable monomer containing at least one acid group is a sulphonic acid or a salt thereof.

16. The process of claim 1, wherein said organic solvent is a strongly polar solvent.

17. The process of claim 16, wherein said strongly polar solvent is a member selected from the group consisting of dimethyl formamide, dimethyl sulphoxide, dimethyl acetamide and N-methyl pyrrolidone.

* * * * *